June 26, 1962  F. W. SIEVE ET AL  3,040,628
GUN-CATAPULT MECHANISM
Original Filed March 29, 1956  5 Sheets-Sheet 1

INVENTORS
FRANK W. SIEVE
PETER JOSEPH OLENICK, Jr.
DAVID CLEONIS FOWLER
BY
ATTORNEYS

June 26, 1962 F. W. SIEVE ET AL 3,040,628
GUN-CATAPULT MECHANISM
Original Filed March 29, 1956 5 Sheets-Sheet 2

INVENTORS
FRANK W. SIEVE
PETER JOSEPH OLENICK, Jr.
DAVID CLEONIS FOWLER

BY
ATTORNEYS

June 26, 1962 F. W. SIEVE ET AL 3,040,628
GUN-CATAPULT MECHANISM
Original Filed March 29, 1956 5 Sheets-Sheet 3

INVENTORS
FRANK W. SIEVE
PETER JOSEPH OLENICK, Jr.
DAVID CLEONIS FOWLER

BY
ATTORNEYS

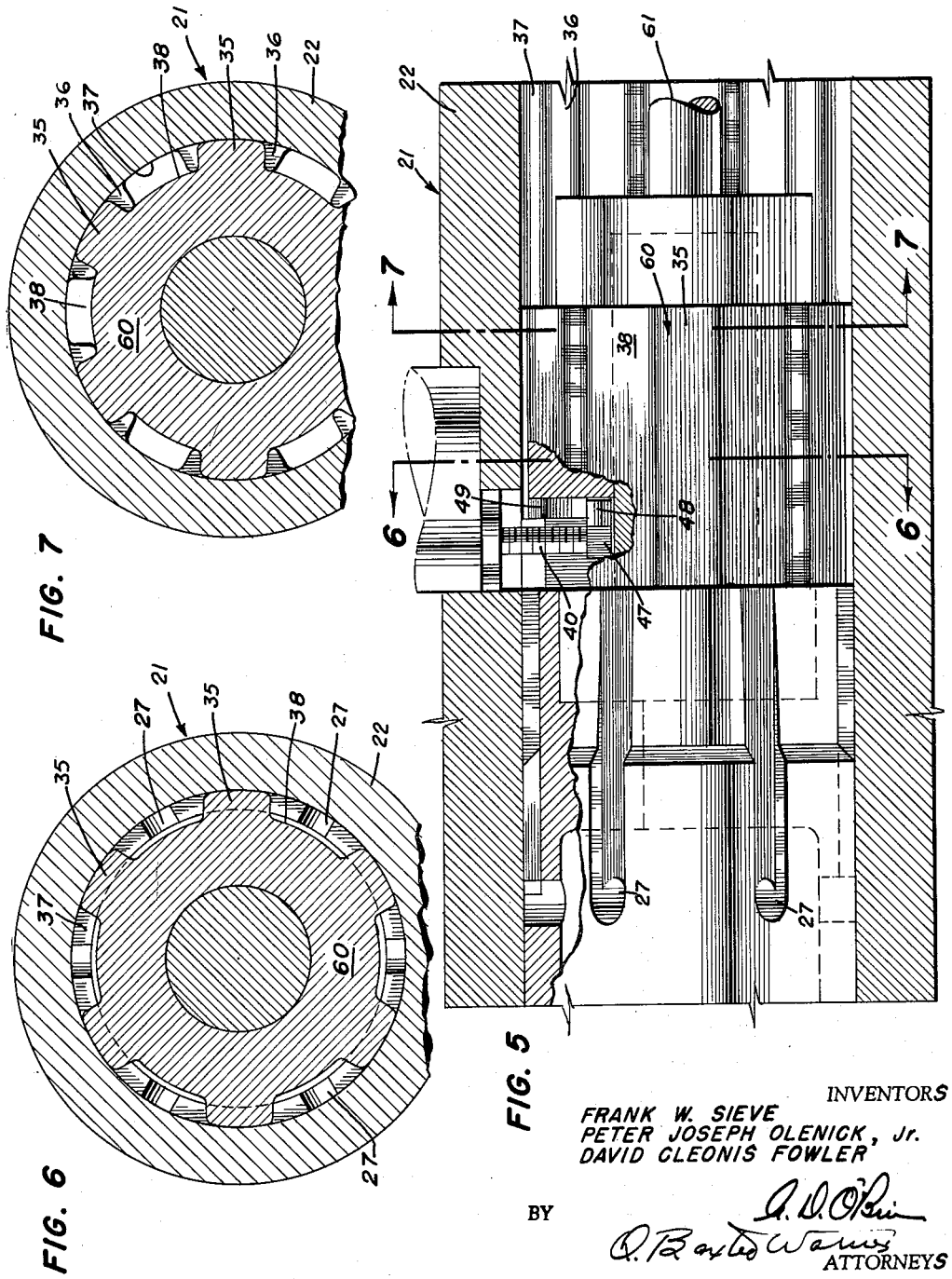

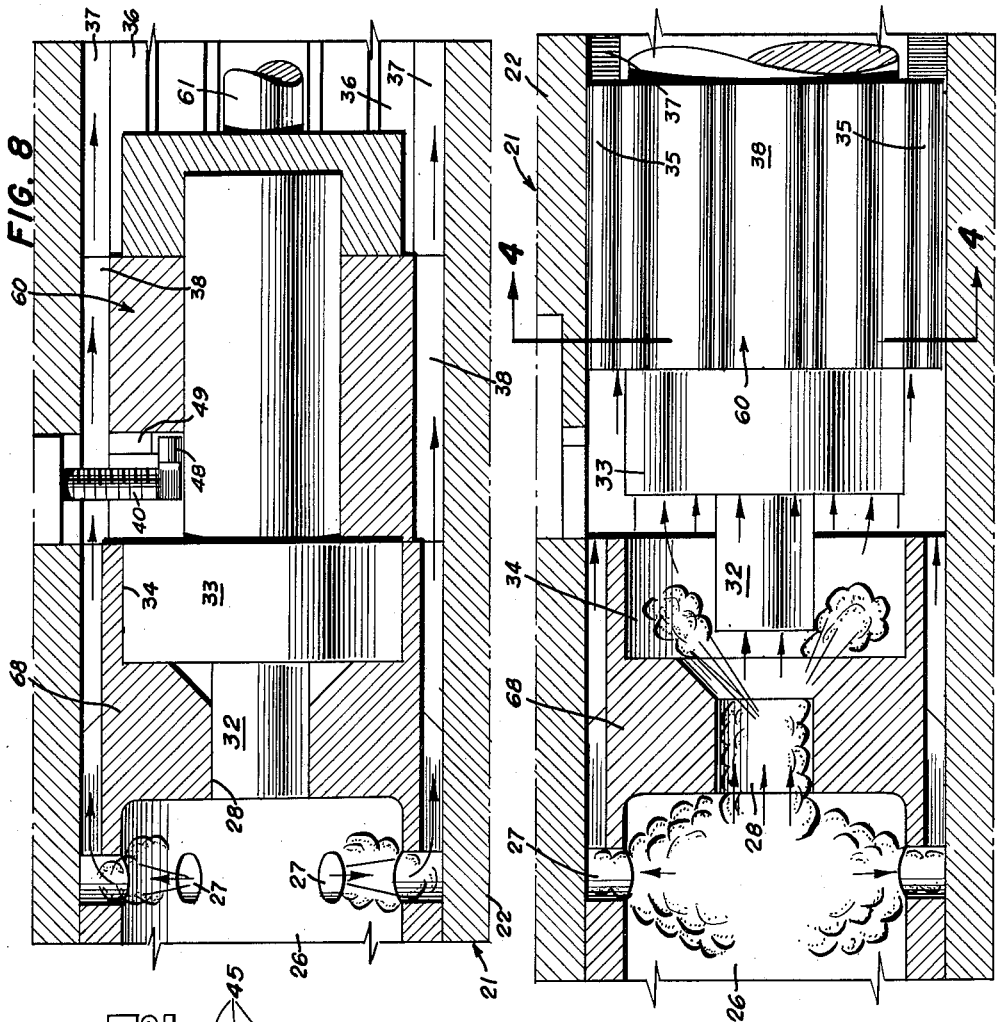

United States Patent Office 3,040,628
Patented June 26, 1962

3,040,628
GUN-CATAPULT MECHANISM
Frank W. Sieve, Falls Church, Va., Peter Joseph Olenick, Jr., Washington, D.C., and David Cleonis Fowler, Silver Spring, Md., assignors to the United States of America as represented by the Secretary of the Navy
Continuation of application Ser. No. 574,938, Mar. 29, 1956. This application May 29, 1956, Ser. No. 588,199
7 Claims. (Cl. 89—1)
(Granted under Title 35, U.S. Code (1952), sec. 266)

The invention described herein may be manufactured and used by or for the Government of the United States of America for governmental purposes without the payment of any royalties thereon or therefor.

The present application is a continuation of copending application Serial No. 574,938, filed March 29, 1956, for Gun-Catapult Mechanism, and now abandoned.

The present invention relates to a gun-catapult mechanism and more particularly relates to high-low power drive apparatus for projecting a driver down a barrel while providing maximum safety to personnel and mechanism and maintaining maximum rigidity and strength with minimum weight and minimum necessary strength characteristics in the safety features.

Prior art guns and prior art catapults have the disadvantage of inherent danger to personnel, lack force multiplying features, casualties often occur to the equipment in use, facility is not lent to dual-purpose, and advantages of both rifling and ejectment without twist of the missile are not combined in the prior art devices.

The present invention overcomes these and other disadvantages of the prior art and provides for a gun-catapult mechanism with features of high-low force multiplication, safety, dual-purpose such that maximum efficiency of operation and safety are afforded and for an economical, accurate, and lightweight apparatus for performing the functions of the inventive device.

Accordingly, an object of the invention is to provide a gun-catapult mechanism which will incorporate features of force multiplication, safety, and simplicity of mechanical operation while retaining features of lightness of weight, accuracy and absolute reliability.

Another purpose of the invention is to provide a gun-catapult mechanism which will provide for features of high-low power drive operation.

Another aim of the invention is to provide safety apparatus for power drive mechanisms wherein a driver may be forced down a barrel in a manner to provide acceleration of the driver and to insure maximum reliability of operation when needed.

Another object of the invention is to provide for ejectment of a driver down a casing or barrel in a manner to provide both maximum driving and maximum catapult action combined with utmost safety and reliability in operation.

Another purpose of the invention is to provide for acceleration means to accelerate a propelled missile along a contoured container wherein an exploded charge may provide propelling force which propelling force is force multiplied and yet which will operate only at desired predetermined times and wherein the equipment will be of minimum weight, maximum economy, and will be provided with features of absolute safety, reliability in service, and avoid possibility of casualties causing injury to personnel and to the equipment.

Another object of the invention is to provide for a gun-catapult mechanism which will operate only when all parts are properly aligned and will have a safety mechanism which possesses maximum safety features, strength, and rigidity in all instances where accidental firing or ejectment is to be avoided.

Other objects and many of the attendant advantages of this invention will be readily appreciated as the same becomes better understood by reference to the following detailed description when considered in connection with the accompanying drawings wherein:

FIG. 5 is an enlarged side elevational view showing a portion of the device of FIG. 1 with further portions broken away to better illustrate the escape ports and actuator mechanism;

FIG. 6 is a cross-sectional view taken along the line 6—6 of FIG. 5 and showing alignment of grooves and escape ports;

FIG. 7 is a cross-sectional view taken along the line 7—7 of FIG. 5 and showing alignment of barrel and driver grooves;

FIG. 8 is a view similar to the showing in FIG. 5 illustrating in detail the escape path upon accidental explosion in safe position of the safety thread mechanism;

FIG. 9 is a side elevational view of a portion of the device of FIG. 1 with certain parts broken away to better illustrate high force action upon arming of the gun-catapult and commencing driving of the splined driver;

FIG. 10 is a cross-sectional view of an illustrative embodiment of the safety actuator of the present invention.

Figure 1:
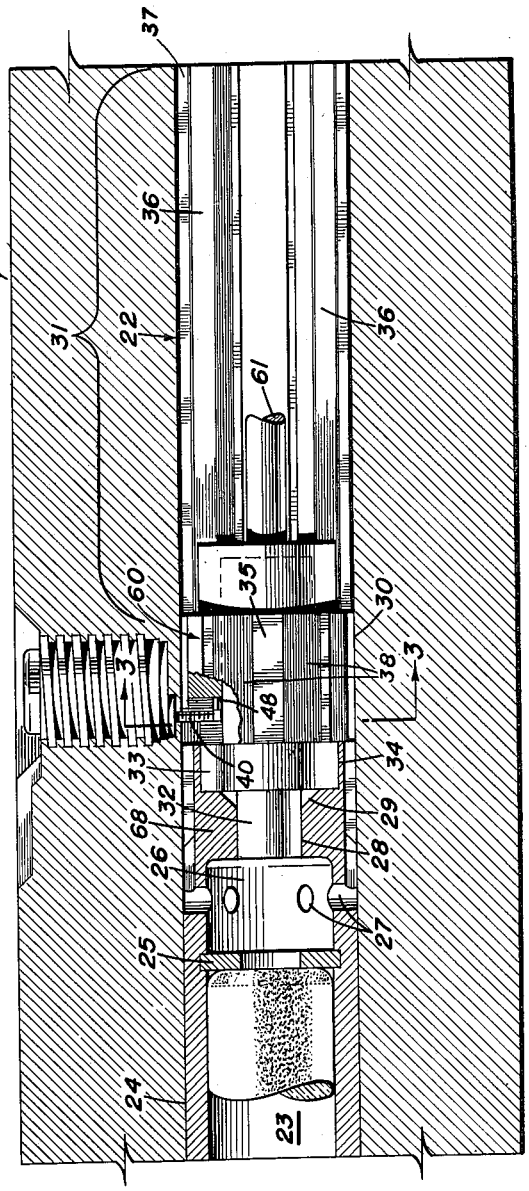
FIG. 1 is a side elevational view of a preferred embodiment of the casing and gun-catapult mechanism of the invention in safe position with parts broken away to better show certain features of the mechanism.
Figure 2:
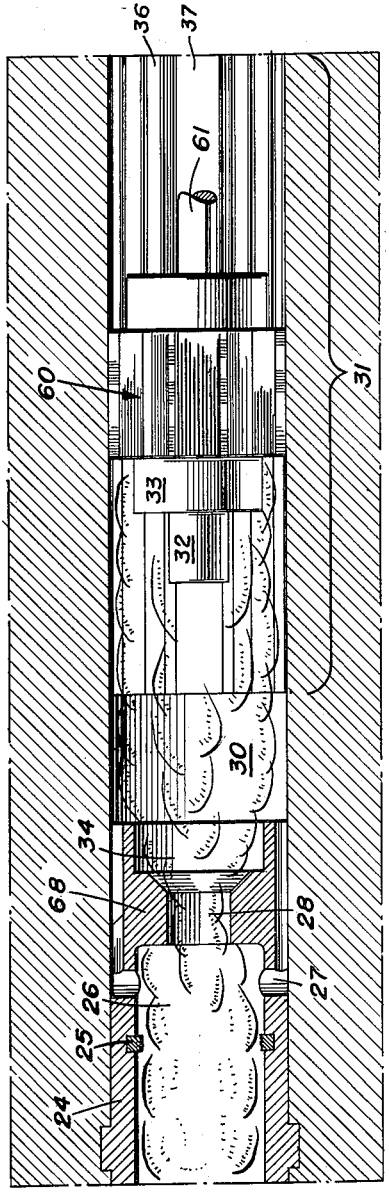
FIG. 2 is an elevational view of the apparatus of FIG. 1 with safety features omitted to lend clarity to the drawing and showing the spline driver in ejected position.
Figure 11:
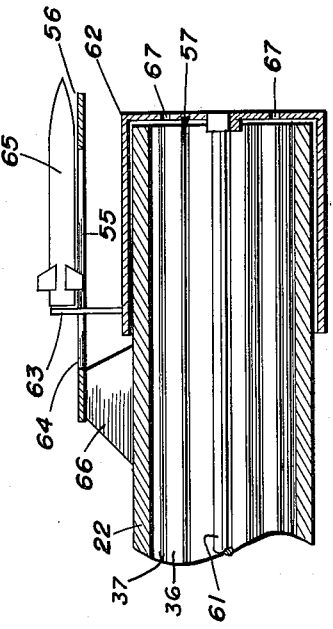
FIG. 11 is a diagrammatic view of one form of the catapult launching means of the inventive gun catapult shown disposed at the forward extremity of the barrel.

Referring more particularly to the drawings the gun-catapult of the present invention is shown in the illustrative embodiment generally at 21. A casing or barrel 22 is splined partially along its length for a purpose to be described. Toward the rearwardly disposed end of the barrel 22 an explosion chamber 23 may be contained in smooth bored section 24 of the casing or barrel 22. In this chamber may be placed an explosive charge (not numbered). Disposed forwardly of the explosion chamber 23 may be a frangible disk spacer member 25 designed to disintegrate upon explosion of the explosive material in explosion chamber 23. Forwardly of the frangible disk spacer 25 may be a normally unpressurized second explosion chamber 26. Upon explosion of the explosive material in explosion chamber 23 the shock or pressure will be transmitted to air or other gaseous particles in the second explosion chamber 26. Radially outward from pressure chamber 26 may extend escape ports 27 for a purpose to be described. Forwardly of the pressure chamber 26 may be a low piston chamber 28, a tapered wall chamber 29 and a high piston chamber 34. Disposed further forwardly of the piston chambers 28, 29, 34 may be an unsplined chamber 30 bored, undercut or otherwise machined in casing 22. Chambers 23, 26, 28, 29, 34 and the recess for disk 25 may be formed in barrel 22 by machining at the time of forming the barrel bore or as shown in FIG. 2 a liner or liners (not numbered) may be inserted in the unsplined portion of barrel 22 having inner contours to define these chambers. Chambers 28, 29 and 34 could also be formed by the bushing 68 as shown. In normal unfired condition disposed in the low or small area piston chamber 28 is the low piston member 32, a taper portion (not numbered) is disposed in the tapered aperture and the high or large area piston member 33 rigidly attached to or integral with the low piston member 32 is disposed in or chamber 34. Disposed forwardly of high piston member 33 is a splined driver member 60 which in normal unfired position may abut against the piston member 33. From the forward end of splined driver 60 in unfired position to the open end of the casing 57 the casing or barrel 22 may be splined as best shown in FIGS. 1 and 2 of the drawings. The casing splines 36 may be in dimensional mating relationship with the grooves 38 between splines 35 of the splined driver 60. At the forward extremity of splined driver 60 when driver 60 is in unfired position is the start of casing spline members 36 which are disposed along casing 22 to the forward end 57 thereof. Alternating with the casing splines 36 are casing grooves 37, and the grooves and splines may be equiangularly radially disposed with respect to the center of the casing and may be disposed adjacent the inner bored surface of the casing or barrel 22. Interposed between the splines 35 of splined driver 60 are the splined driver grooves 38.

As best shown in FIG. 10 an actuator generally designated at 39 may be screwed transversely and normally to the cylindrical portion of gun barrel 22 by means of thread members 45. The gun barrel may have mating threads (not shown). Actuator assembly 39 may comprise a screw threaded pin 40 having a lower head 47 and a roller member 48. Screw threaded on safety pin 40 and disposed circumferentially therearound may be a rotatable sleeve member 58 having integrally or otherwise attached a driver gear member 42. Meshed with driver gear member 42 may be a pinion gear 41. Pinion gear 41 may be mounted on the output shaft 43 of a driver motor 44. Disposed along safety pin 40 may be a slot and retaining key assembly 46 so that upon rotation of motor 44 causing its output shaft 43 to rotate in turn causing pinion 41 to drive gear 42 the safety pin member 40 may be caused to advance or retard in accordance with the direction of rotation of output shaft 43 to plunge safety pin member 40 into and out of the casing or barrel 22. Plunging the safety pin member 40 into the casing 22 and splined driver 60 places the pin in engaged position. Motor 44 may be actuated by electrical signals, by remote control, by mechanical or hydraulic means, or otherwise in ways conventional in the art.

Figure 4:
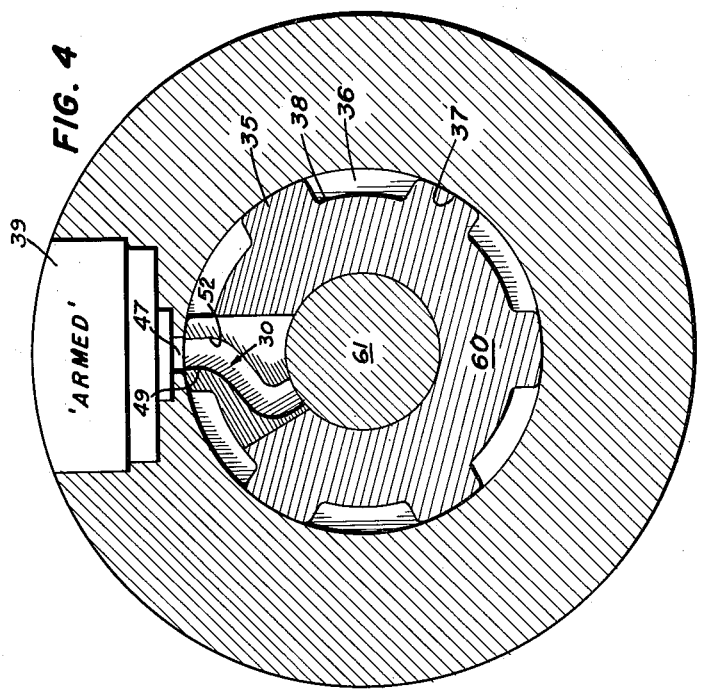
FIG. 4 is a cross-sectional view taken in the direction of the arrows 4—4 of FIG. 9 and showing the mechanism of FIG. 3 upon rotation to armed position.
Figure 3:
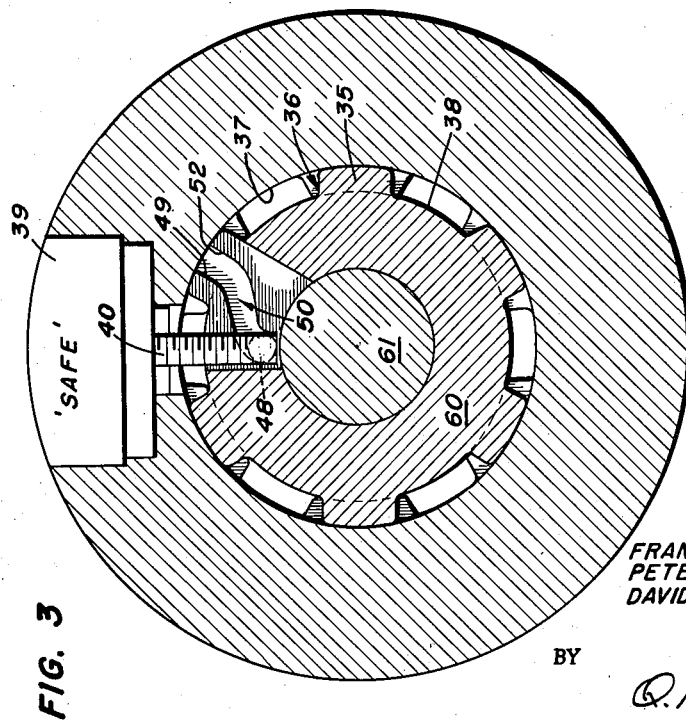
FIG. 3 is a cross-sectional view taken in the direction of the arrows 3—3 of FIG. 1.

As best shown in FIG. 3 in safe position of the safety pin 40, roller 48 will be disposed in position at the inner end of a slot 50 such that splines 35 of splined driver 60 will be aligned directly behind the spline portions 36 of the splined portion 31 of casing or barrel 22. In this position the spline driver 60 is prevented from moving longitudinally with respect to the barrel or casing 22 because of the abutment stopping action of the splines 36 of portion 31 of the casing or barrel 22 upon splines 35 of spline driver 60 which are then in longitudinally aligned position. Upon retraction of safety pin member 40 and its roller member 48, roller member 48 will bear against cam surface 49 of slot 50 it being in close fitting relationship between the cam surfaces 49 and 52. This will cause rotation of the spline driver 60 such that it will then assume the aligned position best shown in FIG. 4 of the drawings. When in such aligned position spline members 35 of splined driver 60 are in alternate spaced radial relation with respect to spline members 36 of portion 31 of the gun barrel, the spline members 35 are then longitudinally aligned with barrel grooves 37 and the splined driver 60 is free to travel longitudinally along the splined portion 31 of the barrel 22. Either integrally attached to or otherwise fastened to splined driver 60 may be a reduced shaft portion 61 which will travel with the splined driver 60. Attached to reduce shaft portion 61 may be a sleeve member 62 adapted to be bearingly fitted over barrel 22 to slide therealong for the length of travel of the splined driver 60 and supported reduced shaft portion 61. Rigidly attached to the sleeve member 62 may be extended a launching finger 63. Launching finger 63 may be disposed through a slot 55 in a platform 64 of the launcher generally designated at 56. Slot 55 may extend in platform 64 throughout the length of travel of launching finger 63 such that the launching finger may travel therealong a distance corresponding to the longitudinal displacement of reduced shaft portion 61 on firing. Launching finger 63 coincident with forward motion of reduced shaft 61 will catapult missile 65. Platform 64 may be supported by any supporting means conventional in the art as, for example, by cantilever support 66.

As best shown in FIG. 6 of the drawings when in safe unfired position of the driver the grooves 38 of splined driver 60 are in alignment with exit ports 27 of normally unagitated chamber 26 so that in the event of undesired explosion or premature explosion the gases will be expelled through the exit ports or escape ports 27 and through the driver grooves 38. As shown in FIG. 7 of the drawings in safe position of the driver the driver grooves 38 are aligned with the casing grooves 37 of casing or barrel 22 such that the gas will continue from the escape ports 27 through the driver grooves 38 thence along the grooves 37 of barrel 22 to escape through the forward end of the barrel. Appropriate escape apertures 67 may be provided at the end face of sleeve member 62 or alternatively through the side walls toward the forward end of barrel 22. These barrel escape ports may be disposed just before the rearward end of sleeve 62 if it is desired to have automatic retraction of the spline driver mechanism 60 in a manner to be presently described.

*Operation*

In safe, unused or unfired position as best shown in FIG. 1 explosion chamber 23, frangible disk spacer 25, empty chamber 26, low piston chamber 28 and high piston chamber 34 are in longitudinal alignment and in juxtaposition with abutting splined driver 60 and with reduced portion 61 which may be integral with the splined driver 60. In this position, low piston member 32 is disposed in low piston chamber 28 and high piston member 33 is disposed in high piston chamber 34. Actuator 39 as has been previously stated is threadedly inserted transversely of the gun barrel 22 and pin 40 is in locked position within the gun barrel 22 and splined driver 60 and as shown in FIG. 3 roller 48 by action with cam 49 has rotated the splined driver 60 in position such that the barrel grooves 37, the splined grooves 38 and the exit ports 27 are all aligned to permit ready flow of gas from the unagitated chamber 26 through the exit ports 27 through the grooves 38 of the splined driver 60 and thence through the barrel grooves 37 and out through the above-described exit ports at the forward end of the barrel. Should an unwanted explosion occur the pressure introduced into the gases present in chamber 26 will cause ejection of the gases through the exit ports 27 thereof and along the barrel 22 to be safely discharged. With the relatively small amount of force in this instance on the rearward face of low piston member 32 the safety pin 40 need be only of sufficient strength, rigidity and dimensions such that firing will not take place. The force exerted on the relatively small face area of low piston member 32 will not be of such magnitude due to the low area over which the pressure is applied to cause shearing of the safety pin 40, which pin therefore need only be of dimensions and material necessary to overcome the relatively small shear force exerted thereby. Upon decision to launch or fire, however, the motor 44 is actuated, as by remote control, electrical, electronic, or other means well-known to the art which causes its output shaft to rotate withdrawing the safety pin 40 in an upward direction out of the splined driver transversely with respect to gun casing 22. Roller 48 will then ride along cam surface 49 and between that cam surface and cam surface 52 resulting force of roller 48 applied to cam surface 49 causing rotation of the driver spline such that it assumes the armed position shown in FIG. 4 wherein the spline portions 35 of the splined driver 60 are aligned with the groove portions 37 of the splined section 31 of the casing 22 so that the splined driver is free to move along the casing 22 toward the forward end thereof and such that the ports 27 no longer lead into an open path for expanded gases out of the forward end of the barrel 22. The explosive charge 23 is then ignited causing spacer diaphragm 25 to disintegrate or to collapse and the chamber 26 then becomes filled with expanding gases. The expanding gases in chamber 26 cause pressure to be transmitted to the rearward face of low piston member 32 and to the rearward face of the splines of splined driver 60. Low piston member 32 then no longer being restrained by safety pin 40 commences to move forwardly of the gun casing bearing against the splined driver 60 to cause splined driver 60 to effect motion along the barrel 22 toward the forward end thereof. Upon motion of the low piston 32 and integral or rigidly attached high piston member 33 toward the forward end of the barrel 22 a chamber then exists behind the high piston rear end face causing pressure to be also exerted against the area therein which imparts the pressure over a total greater area causing an increase in force since $$\text{pressure} = \frac{\text{force}}{\text{area}}$$

and thereby accelerating the splined driver 60 along the barrel 22 a number of times which is a function of the total area of the high and low piston rear face surfaces plus the splined driver rear face surfaces as compared with the low piston rear face surface. The splined driver and its associated shaft 61 then may ride at an extremely rapid rate toward the forward end of the barrel 22. This imparts a rather large momentum to the shaft portion 61 which longitudinal motion may in turn be transmitted to the catapult mechanism. By means such as sleeve member 62 which may be attached or otherwise driven by the reduced shaft portion 61 the sleeve 62 may be caused to move in the direction of the forward end of the barrel 22 at a correspondingly very rapid rate. Launching finger 63 which may be integrally or otherwise rigidly attached to the sleeve member 62 upon being projected therewith will cause catapulting action upon missile 65. Launching finger 63 may be mounted in a slot 65 disposed in platform member 64 which may serve to support the missile 65. Platform 64 may be supported as for example by means of cantilever support 66. Resulting action of this operation thereby causes catapulting by the sleeve member and additional gun barrel action may, if desired, be effected by motion transmitted through means of shaft portion 61 when the splined driver 60 is rapidly moved from a rearward position with respect to the barrel 22 to an extreme forward position toward end 57. After firing and launching which may be effected substantially simultaneously in the manner shown, return of the driver 60 and its associated sleeve portion 62 may be effected in various ways. For example, spring or other bias means (not shown) may serve to return the splined driver 60 and attached integrated parts and the high and low piston members 28 and 29 into non-firing position. Methods of recoil or counterrecoil may also be used, for example, one such system contemplated would embody a form wherein the end cylindrical wall of sleeve 62 would be solid and wherein through portholes in the gun casing disposed rearwardly of the sleeve the compressed gas upon flowing down the gun barrel would be emitted through ports occurring before the beginning of the sleeve portion at a certain sleeve position. In this manner compression of the gas disposed between the cylindrical end of sleeve 62 and the forward portion of the splined driver apparatus would take place. After the pressure is reduced in the after part of the chamber by leakage or by driving of the gas out of the portholes before sleeve 62, this pressure would then be below the pressure caused by compression of the gas trapped between the splined driver 60 and the end cylindrical wall of sleeve 62 thus causing a recoil action driving spline 62 toward its original non-fired position. Another method of accomplishing the recoil to restored initial conditions could be by means of electrical circuits or by means of a path of the expanding gases through the casing wall and into the space between the splined driver and the end wall of sleeve 62 timed such that upon the end of the stroke of the spline shaft the compression chamber thus formed between the splined driver and the sleeve end would be filled in part with compressed gas which would then serve to return the parts to non-firing condition wherein action of the safety pin 40 in response to actuation of motor 44 could be synchronized to once again cause safety position and permit gas to be expanded out of the end portions of the cylinder. In this case the disk 25 would be collapsible rather than frangible. Apertures 67 of course are formed in the cylindrical sleeve 62 with operation as shown in the embodiment herein.

Obviously many modifications and variations of the present invention are possible in the light of the above teachings. It is therefore to be understood that within the scope of the appended claims the invention may be practiced otherwise than as specifically described.

What is claimed is:

1. Apparatus for providing accelerated movement from a first position to a second position said apparatus comprising a cylindrical barrel member, a splined driver slidably and rotatably supported in said barrel member and having a cam slot formed therein, said barrel member having longitudinally disposed parallel splines on its inner surface, said splined driver having longitudinally disposed parallel splines on its outer surface adapted to mate with the grooves arranged between the splines of said barrel member only when the driver is rotated a predetermined amount, a first piston means having a small pressure impinging area and disposed in said barrel member, a second piston means having a large pressure impinging area and disposed within said barrel adjacent said first piston means and between said first piston means and said splined driver, said driver being carried by said piston means and movable thereby, said barrel member having structure defining a chamber to fit said adjacent first and second piston means in contour receiving relationship, means to exert pressure against said first piston means to cause longitudinal movement of the splined driver along said barrel after said driver is rotated said predetermined amount, movement of the first piston and second piston means out of the chamber permitting exertion of pressure on the face of the second piston means which is adjacent the first piston means, to thereby multiply the area over which the pressure is distributed tending to urge the piston means along the barrel, thereby providing greater force on the combination of first piston means and second piston means to further accelerate the splined driver in its movement along the barrel, a casing carried by said barrel member, threaded means slidably mounted within said casing, means mounted on one end of said threaded means and normally in engagement with said cam slot for releasably locking said splined driver to the barrel member until the locking means is moved within said cam slot from an initial position to a final position, said locking means causing rotation of the splined driver said predetermined amount as the locking means is moved from the initial position to said final position, means rotatably supported within the casing in engagement with said threaded means for moving the threaded means slidably an amount sufficiently to move the locking means from the initial position to said final position, means rotatably supported within the casing in engagement with said threaded means for moving the threaded means slidably an amount sufficiently to move the locking means from the initial position to said final position in response to the rotation of the rotatable means, and means disposed within the casing and operatively connected to said rotatable means for imparting rotary movement thereto.

2. Means for enlarging the area over which a member has pressure exerted from that in a first nonmoving position to the area over which the member has pressure exerted in a second moving position; said means comprising a barrel member, structure in said barrel defining an explosive chamber disposed in said barrel member, barrel structure defining a second normally unagitated chamber, a frangible disk member dividing said explosive chamber from said normally unagitated chamber, exit ports extending radially outward from said normal unagitated chamber through the barrel structure, barrel filler structure defining a first low piston receiving chamber and a second high piston receiving chamber, a first relatively small diameter piston member and a second relatively large diameter piston member integral with said first low piston member, the contours of said low piston chamber and high piston chamber being of size and shape to slidably and bearingly receive said first and second piston members, a splined driver member having a plurality of splines disposed at intervals around its outer periphery, the splined driver being substantially bearingly received in said barrel, said barrel having its inner bore splined from a first end thereof to a position adjacent said driver member when said driver member is in at rest position, grooves defined by the spaces between said barrel splines, said barrel grooves being of dimensions and shape to receive the splines of said driver member when the splines of said driver member are longitudinally aligned with said barrel grooves, said driver splines being aligned with said barrel splines when in at rest position, the grooves of said driver member being aligned with the grooves of said barrel member and with the exit ports from said normally unagitated chamber when said driver member is in at rest position, thereby providing pressure bypass from the normally unagitated chamber through the barrel, through the grooves of the driver, and through the grooves of the splined portion of the barrel at times when predetermined shifting of said driver from the first position to the second position is not to take place, means to rotate said driver member when displacement in its longitudinal position is to take place, rotation of said driver member causing said driver splines to become aligned with said barrel grooves and causing blocking of the exit ports from said normally unagitated chamber thereby permitting gas in the second chamber upon explosion to bear against the face of the low piston member, displacement of the low piston member and the high piston member out of its chambers permitting the gas under pressure to escape from the second chamber to bear against the rear surface of said low piston and said high piston member to thereby enlarge the area against which the pressure is directed and hence the total directed force to cause acceleration of the piston members to thereby cause acceleration of displacement of the driver member, said driver member being displaced by urging of said piston members against an end surface of said driving member.

3. An apparatus of the class described comprising a cylindrical barrel member, a driver slidably and rotatably supported on said barrel member and having a cam slot formed therein, a plurality of mutually spaced spline elements and grooves formed on the inner surface of said barrel member, complementary mating mutually spaced spline elements and grooves formed on the outer surface of the drive member and normally in longitudinal alignment with the spline elements and grooves on said barrel member, a threaded pin slidably mounted on said barrel member, a roller mounted on one end of said pin and normally in engagement with said cam slot for maintaining said spline elements and grooves on said driver and barrel member in said longitudinal alignment, said roller being movable through said cam slot from an initial position to a final position to rotate said driver a predetermined amount to cause registration of the spline elements on the driver with the grooves on the barrel member and registration of the spline elements on the barrel member with the grooves on the driver, a sleeve rotatably supported on said barrel member in threaded engagement with said pin for slidably moving said pin in response to rotation of the sleeve an amount sufficiently to move said roller through the cam slot from an initial position to said final position, rotatable means connected to said sleeve for rotating said sleeve, and means for moving said driver longitudinal along said barrel member when the driver has been rotated said predetermined amount.

4. A claim in accordance with the device of claim 3, wherein the rotatable means includes a motor having a shaft driven thereby, a driving connection between the shaft and said sleeve for rotating the sleeve as the shaft is driven by said motor.

5. A claim in accordance with the device of claim 3 wherein the rotatable means includes a motor having a shaft driven by the motor, a gear carried on one end of said shaft and rotated thereby as the shaft is driven by the motor, a complementary gear carried on one end of said sleeve in engagement with said gear on the shaft and driven thereby for rotating said sleeve.

6. An apparatus of the class described comprising a cylindrical barrel member, a driver slidably and rotatably supported on said barrel member and having a cam slot formed therein, a plurality of mutually spaced spline elements and grooves formed on the inner surface of said barrel member, complementary mating mutually spaced spline elements and grooves formed on the outer surface of the driver and normally in longitudinal alignment with the spline elements and grooves on said barrel member to prevent longitudinal movement of said driver along said barrel member until said driver has been rotated an amount sufficiently to cause registration of the spline elements on the driver with the grooves on the barrel member and registration of the spline elements on the barrel member with the grooves on the driver, a threaded pin slidably mounted on said barrel member, a roller mounted on one end of said pin and normally in engagement with said cam slot for maintaining said spline elements and grooves on the driver and barrel member in said longitudinal alignment and for rotating the driver a predetermined amount to cause said registration between the spline elements on the driver and the grooves on the barrel member and between the spline elements on the barrel member and the grooves on the driver as the roller moved from an initial position to a final position through said cam slot, a sleeve rotatably supported on the barrel member in threaded engagement with said pin for slidably moving said pin in response to rotation of the sleeve an amount sufficiently to move said roller through the cam slot from said initial position to said final position, a motor including a driving connection between said sleeve and motor for rotating said sleeve, and means for moving said driver longitudinal along said barrel member as the driver is rotated said predetermined amount.

7. A device of the class described comprising an elongated cylindrical member, an explosive actuated member rotatable within said cylindrical member from an initial position to an armed position and slidable longitudinally therein when said element is in said armed position, a casing mounted on said elongated member, a cam slot formed in said element, a threaded pin slidably disposed within said casing and movable therein a predetermined amount, a roller mounted on one end of said pin and normally disposed within said cam slot for rotating said element from said safe position to said armed position as said roller is moved through said cam slot by the pin in response to movement of the pin said predetermined amount, a sleeve rotatably mounted in said casing in threaded engagement with said pin for moving the pin said predetermined amount as said sleeve is rotated, driving means including a motor operatively connected to said sleeve for imparting rotary movement to the sleeve, and explosive means disposed within said cylindrical member for applying said predetermined amount of pressure against said element when the element is in said armed position to move the element slidably longitudinally along the cylindrical member.

References Cited in the file of this patent

UNITED STATES PATENTS

| | | |
|---|---|---|
| 1,559,183 | Rimailho | Oct. 27, 1925 |
| 1,799,366 | Heinkel | Apr. 7, 1931 |
| 2,456,011 | Musser | Dec. 14, 1948 |

FOREIGN PATENTS

| | | |
|---|---|---|
| 169,919 | Switzerland | Sept. 1, 1934 |
| 608,704 | Great Britain | Sept. 20, 1948 |